United States Patent [19]

Miller

[11] Patent Number: 4,569,872

[45] Date of Patent: Feb. 11, 1986

[54] INSULATING WINDOW PANEL

[76] Inventor: Albert S. Miller, 8921 Middlebelt Rd., Livonia, Mich. 48150

[21] Appl. No.: 766,987

[22] Filed: Aug. 19, 1985

[51] Int. Cl.$^4$ ............................................. B32B 3/00
[52] U.S. Cl. ........................................ 428/71; 428/76; 428/178; 428/188; 428/314.4; 428/317.1; 428/319.7
[58] Field of Search ................. 428/34, 38, 71, 76, 428/178, 188, 314.4, 314.8, 317.1, 317.5, 317.7, 319.3, 319.7, 412

[56] References Cited

U.S. PATENT DOCUMENTS

| 4,158,278 | 6/1979 | Cardinale et al. | 428/34 |
| 4,288,490 | 9/1981 | Alfter et al. | 428/314.8 |
| 4,525,406 | 6/1985 | Pollock | 428/178 |

FOREIGN PATENT DOCUMENTS 2909725 9/1980 Fed. Rep. of Germany ...... 428/178

*Primary Examiner*—William J. Van Balen
*Attorney, Agent, or Firm*—Charles W. Chandler

[57] ABSTRACT

An insulating, translucent panel useful as a storm window, a translucent wall within a building, or a skylight includes a polyethylene closed cell foam sheet adhered to a polycarbonate structural sheet. In one form of the invention, the two sheets are mounted within a frame which compresses the foam sheet edge so that the two sheets can be mounted in the frame without the use of screws. The polycarbonate sheet has parallel, closed channels disposed in a vertical position so that condensate drains to the bottom of the window assembly. A bottom frame member drains off the condensate.

6 Claims, 4 Drawing Figures

U.S. Patent  Feb. 11, 1986  4,569,872
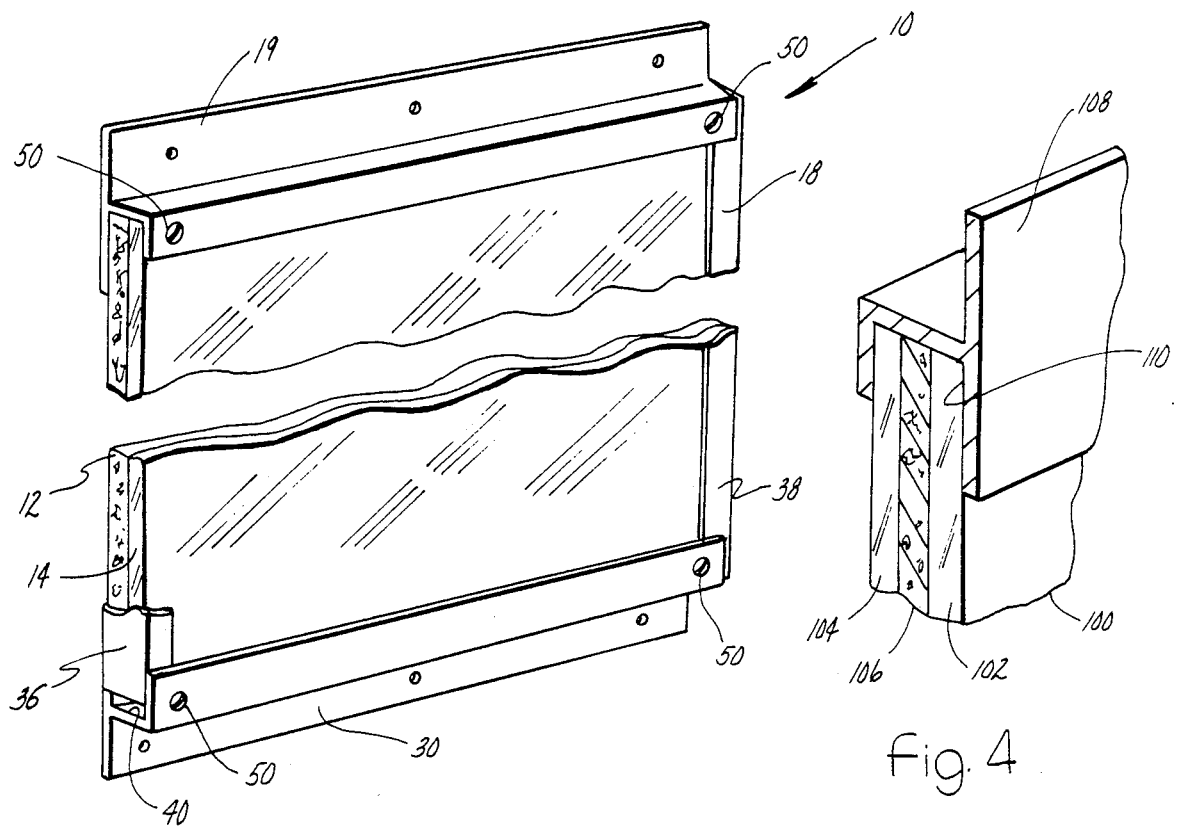
fig. 1
fig. 4
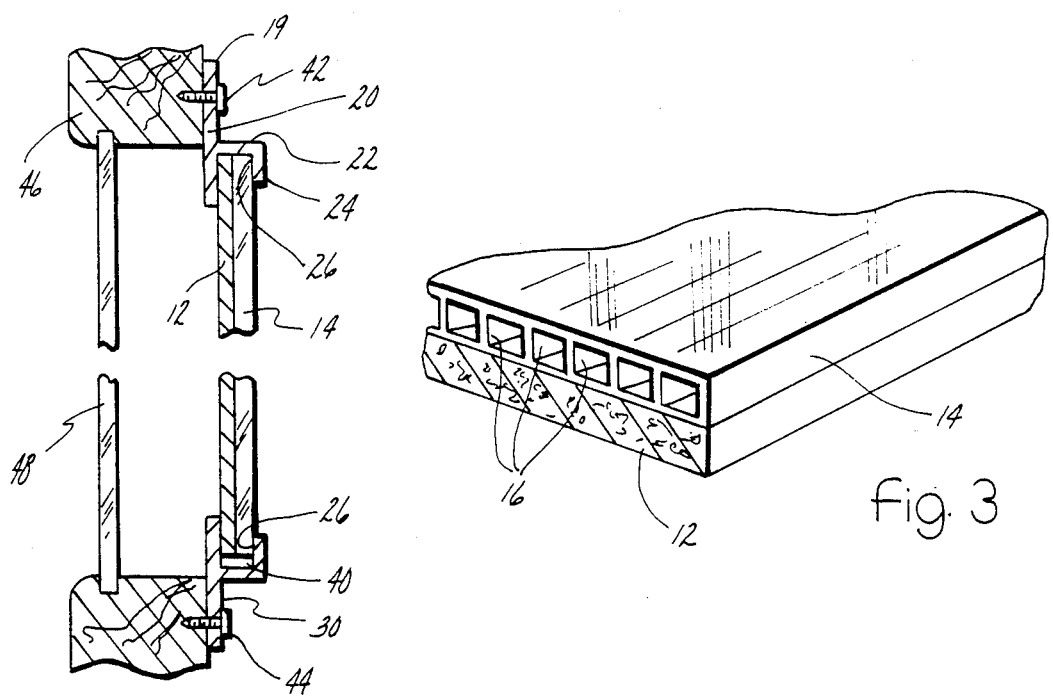
fig. 3
fig. 2

4,569,872

INSULATING WINDOW PANEL

BACKGROUND OF THE INVENTION

This invention is related to an insulating panel useful either for existing windows or for applications where a translucent wall is desired.

Polyethylene closed cell foam is sometimes used as an insulating means by adhering it over window glass. Polycarbonate structural sheet, an extruded translucent plastic sheet having side-by-side, parallel channels is sometimes used in greenhouses in place of conventional window glass.

SUMMARY OF THE INVENTION

The broad purpose of the present invention is to provide an insulated window formed of a sheet of polyethylene closed cell foam adhered to a polycarbonate extruded structural sheet to form a composite panel having the advantages of excellent insulating qualities as well as being translucent so that it can be employed either as a wall panel or a storm window. It eliminates window breakage, reglazing, painting, sun glare, reduces inside and outside noise, reflects internally produced light, and controls condensation.

The preferred embodiment of the invention employs a frame having channel-shaped members which engage the composite panel to compress the foam in such a manner that it is unnecessary to employ threaded fasteners for attaching the panel to the frame. Normally the panel is mounted such that the closed channels are disposed in a vertical direction so that condensate forming in the channels drains to the bottom of the panel. The bottom frame member functions to remove the condensate.

In another embodiment of the invention, the panel is formed with a sheet of closed cell foam sandwiched between two polycarbonate sheets.

Still further objects and advantages of the invention will become readily apparent to those skilled in the art to which the invention pertains upon reference to the following detailed description.

DESCRIPTION OF THE DRAWING

The description refers to the accompanying drawing in which like reference characteristics refer to like parts throughout the several views, and in which:

FIG. 1 is a fragmentary view of a storm window illustrating the preferred embodiment of the invention;

FIG. 2 is an enlarged sectional view illustrating the manner in which the storm window is mounted in a conventional basement window opening;

FIG. 3 is a fragmentary view of the foam sheet attached to the polycarbonate sheet; and FIG. 4 is a fragmentary view of another embodiment of the invention.

DESCRIPTION OF THE PREFERRED EMBODIMENT

Referring to the drawing, a preferred composite panel, illustrated at 10, comprises a polyethylene closed cell foam sheet 12 disposed in a face-to-face relationship with polycarbonate extruded plastic sheet 14. Sheet 12 is attached by adhesive means to sheet 14.

The polyethylene foam is translucent, about ¼ inch thick, and the extruded sheet is about 6 mm thick, however, each can be of any other appropriate thickness.

FIG. 3 illustrates a section of a preferred panel. The extruded sheet is preferrably formed of a transparent plastic and extruded with a series of 4-sided channels 16. The channels are supported in a vertical position so that condensation forming in the extruded sheet flow downwardly. The channels are square having an internal dimension about 7/32 inch square.

The panel is mounted in a 4-sided frame 18. The frame includes an extruded aluminum upper frame member 19 having an outer wall 20, a short wall 22 formed at right angles to wall 20, and lip 24 disposed parallel to the inner edge of wall 20 to define channel 26. The distance between the side walls of channel 26 is slightly less than ¼ inch so the side walls compress the foam sheet to retain it within the frame member.

The frame includes a lower frame member 30 having an identical configuration to upper member 19, however, it is to be noted that channel 26 of the lower frame member is disposed about ¼ inch below the bottom edge of sheet 14 so that condensate flowing through the vertical channels of sheet 14 flow out of the panel into the lower frame channel.

Lower frame member 30 also has a wall 34 that is coplanar with wall 20 of the upper frame member. The lower frame member also compresses the foam sheet to retain it in the frame channel. Referring to FIG. 1, the upper and lower frame members are also connected to two identical aluminum angle sides 36 and 38. The lower edge of side 36 is spaced above lower channel 26 to form drain opening 40.

The upper and lower frame members are attached by fastener members 42 and 44 to window casing 46 in order to mount the panel in position.

The insulating panel is mounted in a spaced relationship with respect to glass window 48 mounted in the frame with the foam side of the panel facing the glass window.

The composite panel comprising the foam sheet and the extruded plastic sheet can be mounted as a translucent interior wall. It does not necessarily have to function only as an insulating member.

FIG. 4 illustrates another embodiment of the invention in which composite panel 100 comprises an inner polycarbonate extruded sheet 102 and an outer polycarbonate sheet 104, similar to sheet 102, with polyethylene closed cell foam sheet 106 sandwiched between the inner and outer sheets. Frame 108 has a channel 110 having an internal width slightly less than the over-all thickness of the panel to slightly compress the panel to obviate the necessity of using threaded fasteners.

Having described my invention, I claim:

1. A composite panel, comprising:
   a polyethylene closed cell foam first sheet;
   an extruded polycarbonate structural second sheet having a planar surface and a plurality of 4-sided, parallel channels extending between opposite side edges of the second sheet; and
   adhesive means attaching the first sheet in a face-to-face relationship with the planar surface of the second sheet.

2. A composite panel as defined in claim 1, including frame means for supporting the panel in a position in which the parallel channels are disposed in a vertical position.

3. A composite panel means as defined in claim 2, including frame means having an elongated drain channel adjacent the bottom of the structural sheet at right angles to the closed channels for the removal of condensate therefrom.

4. A composite panel as defined in claim 1, including a second extruded polycarbonate structural sheet disposed on the opposite side of the foam first sheet as the first mentioned polycarbonate structural sheet, the foam sheet being sandwiched between the two structural sheets.

5. A composite panel as defined in claim 1, including a frame member having a channel with spaced parallel side walls and mounted along opposite edges of the first and second sheets to compress the foam between the side walls of the channel.

6. A composite panel as defined in claim 1, including frame means connected around the edges of the first and second sheets and adapted to support the sheets in a position adjacent and parallel to a glass window pane.

* * * * *